(12) United States Patent
Wang et al.

(10) Patent No.: US 12,398,923 B2
(45) Date of Patent: Aug. 26, 2025

(54) CONDENSING HEAT EXCHANGER AND WATER HEATER HAVING SAME

(71) Applicant: A. O. Smith (China) Water Heater Co., Ltd., Nanjing (CN)

(72) Inventors: Wei Wang, Ninjing (CN); Chengjun Zhang, Ninjing (CN); Kang Lin, Ninjing (CN)

(73) Assignee: A.O. SMITH (CHINA) WATER HEATER CO., LTD., Nanjing (CN)

( * ) Notice: Subject to any disclaimer, the term of this patent is extended or adjusted under 35 U.S.C. 154(b) by 174 days.

(21) Appl. No.: 18/255,888

(22) PCT Filed: Aug. 24, 2021

(86) PCT No.: PCT/CN2021/114193
§ 371 (c)(1),
(2) Date: Jun. 5, 2023

(87) PCT Pub. No.: WO2022/121376
PCT Pub. Date: Jun. 16, 2022

(65) Prior Publication Data
US 2024/0102694 A1    Mar. 28, 2024

(30) Foreign Application Priority Data

Dec. 7, 2020    (CN) .......................... 202011417846.7

(51) Int. Cl.
*F24H 9/00*    (2022.01)
*F24H 1/00*    (2022.01)
*F24H 8/00*    (2022.01)

(52) U.S. Cl.
CPC ........... *F24H 8/006* (2013.01); *F24H 1/0036* (2013.01); *F24H 9/0026* (2013.01)

(58) Field of Classification Search
CPC . F24H 1/0036; F24H 1/43; F24H 8/00; F24H 9/0005; F24H 9/0026; F28D 1/06;
(Continued)

(56) References Cited

U.S. PATENT DOCUMENTS 4,502,626 A * 3/1985 Gerstmann ............. F24D 12/02
122/33
5,405,261 A * 4/1995 Scraggs .................... F23G 7/05
126/110 R
(Continued)

FOREIGN PATENT DOCUMENTS

CN        1950648 A        4/2007
CN     202254310 U        5/2012
(Continued)

OTHER PUBLICATIONS

International Search Report and Written Opinion for Application No. PCT/CN2021/114193 dated Nov. 23, 2021 (17 pages with translation).
(Continued)

*Primary Examiner* — Gregory A Wilson
(74) *Attorney, Agent, or Firm* — Michael Best & Friedrich LLP (57) ABSTRACT

A condensing heat exchanger (100) capable of lowering a requirement for a fan and a water heater having the same, wherein the condensing heat exchanger (100) comprises: a heat exchanger housing (110) having a flue gas inlet (101) and a flue gas outlet (102); and a heat exchange unit (104) located within the heat exchanger housing (110), wherein a sidewall flue gas exhaust channel (105) communicated with the flue gas outlet (102) is provided between the heat exchange unit (104) and an inner sidewall of the heat exchanger housing (110), the heat exchange unit (104) surrounds a flue gas inlet channel (103) communicated with the flue gas inlet (101), the sidewall flue gas exhaust channel
(Continued)

(105) surrounds the heat exchange unit (104), and the heat exchange unit (104) is internally provided with a heat exchange flue which communicates the flue gas inlet channel (103) with the sidewall flue gas exhaust channel (105).

21 Claims, 6 Drawing Sheets

(58) Field of Classification Search
CPC ....... F28D 7/16; F28F 3/12; F28F 3/14; F28B 9/08
See application file for complete search history.

(56) References Cited

U.S. PATENT DOCUMENTS

| | | | |
|---|---|---|---|
| 7,523,721 B2 * | 4/2009 | Hamada | F24H 1/52 122/31.1 |
| 2008/0149315 A1 | 6/2008 | Hata et al. | |
| 2014/0033994 A1 * | 2/2014 | Ding | F24H 1/206 122/20 B |

FOREIGN PATENT DOCUMENTS

| | | | | |
|---|---|---|---|---|
| CN | 102679550 | A | | 9/2012 |
| CN | 107062598 | A | | 8/2017 |
| CN | 110530021 | A | * | 12/2019 |
| CN | 112413899 | A | | 2/2021 |
| CN | 213841355 | U | | 7/2021 |
| DE | 102006051515 | A1 | * | 5/2007 ............. F23N 1/022 |
| EP | 1279903 | A2 | | 1/2003 |
| JP | 2006317036 | A | | 11/2006 |
| JP | 2007127331 | A | | 5/2007 |
| RU | 2680458 | C1 | * | 2/2019 |
| WO | 2005108875 | A1 | | 11/2005 |
| WO | WO-2013063892 | A1 | * | 5/2013 ............... F23J 15/06 |
| WO | 2022121376 | A1 | | 6/2022 |

OTHER PUBLICATIONS

International Preliminary Report on Patentability for Application No. PCT/CN2021/114193 dated Jun. 13, 2023 (11 pages with translation).

* cited by examiner

CONDENSING HEAT EXCHANGER AND WATER HEATER HAVING SAME

CROSS-REFERENCE TO RELATED APPLICATION(S)

This application is a national phase entry of PCT/CN2021/114193, filed on Aug. 24, 2021, which claims priority to CN 202011417846.7, filed on Dec. 7, 2020, the entire contents of which are fully incorporated herein by reference.

RELATED APPLICATION

This application claims priority of the Chinese patent application No. 202011417846.7 filed on Dec. 7, 2020, which is incorporated herein by reference.

FIELD

The present disclosure relates to the field of water heating, and particularly to a condensing heat exchanger and a water heater having the same.

BACKGROUND

At present, gas water heaters have been widely used, in which a condensing gas water heater, as an efficient gas combustion device, has a great energy saving potential. Compared with the ordinary gas water heaters, the condensing gas water heater is further provided with a condensing heat exchanger above a sensible heat exchanger, which can fully absorb the heat of high-temperature flue gas and improve the heat exchange efficiency of the whole machine.

However, the existing condensing gas water heater is complicated in the design of the flue gas circulation path, which leads to a large resistance to flue gas flow and a high requirement for a fan. Moreover, the condensed water is not easy to be discharged, and the condensing efficiency is low.

SUMMARY

In view of the above problems, an objective of the present disclosure is to provide a condensing heat exchanger capable of lowering a requirement for a fan and a water heater having the same.

Another objective of the present disclosure is to provide a condensing heat exchanger and a water heater having the same, so as to improve a condensing efficiency.

In order to achieve at least one of the above objectives, the present disclosure adopts the following technical solution:

A condensing heat exchanger, comprising:
a heat exchanger housing having a flue gas inlet and a flue gas outlet; and
a heat exchange unit located in the heat exchanger housing,
wherein a sidewall flue gas exhaust channel communicated with the flue gas outlet is provided between the heat exchange unit and an inner sidewall of the heat exchanger housing, the heat exchange unit surrounds a flue gas inlet channel communicated with the flue gas inlet, the sidewall flue gas exhaust channel surrounds the heat exchange unit, and the heat exchange unit is internally provided with a heat exchange flue which communicates the flue gas inlet channel with the sidewall flue gas exhaust channel.

As a preferred embodiment, an end of the heat exchange unit close to the flue gas outlet is shielded and blocked by a shielding plate, and the flue gas inlet channel extends from the flue gas inlet to the shielding plate.

As a preferred embodiment, the heat exchange unit comprises a plurality of heat exchange tube layers stacked in a vertical direction, the heat exchange tube layers comprise a plurality of heat exchange tube rings nested with one another and having surrounded areas gradually decreasing from outside to inside in a radial direction, and the heat exchange flue comprises a spacing flue located between adjacent two of the heat exchange tube layers in an up-down direction.

As a preferred embodiment, the heat exchange tube rings having the same surrounded area of the different heat exchange tube layers are stacked in the vertical direction to form a tube ring stack.

As a preferred embodiment, the tube ring stack is formed by one heat exchange tube spirally extending from the water inlet to the water outlet, and the heat exchange tube layer is formed by the heat exchange tube rings located at the same height of the different tube ring stacks.

As a preferred embodiment, the heat exchanger housing is provided with a water inlet part and a water outlet part, and at least two of the tube ring stacks are connected in parallel between the water inlet part and the water outlet part.

As a preferred embodiment, the heat exchanger housing is provided with a water inlet part and a water outlet part, and at least two of the tube ring stacks are connected in series between the water inlet and the water outlet.

As a preferred embodiment, the heat exchange unit comprises a first number of tube ring stacks connected in parallel and a second number of tube ring stacks connected in parallel, and the first number of tube ring stacks and the second number of tube ring stacks are connected in series between the water inlet part and the water outlet part.

As a preferred embodiment, the heat exchange tube layer is formed by one heat exchange tube spirally winding from outside to inside.

As a preferred embodiment, at least two of the heat exchange tube layers are connected in parallel between the water inlet part and the water outlet part, and/or at least two of the heat exchange tubes are connected in series between the water inlet part and the water outlet part.

As a preferred embodiment, the heat exchanger housing is provided with a water inlet part and a water outlet part, and the heat exchange unit comprises a heat exchange tube communicated between the water inlet part and the water outlet part.

As a preferred embodiment, the water inlet part is disposed close to a bottom of the heat exchanger housing, and the water outlet part is disposed close to a top of the heat exchanger housing.

As a preferred embodiment, a vertical spacing between adjacent two of the heat exchange tube layers is less than a horizontal spacing between adjacent two of the tube ring stacks.

As a preferred embodiment, a vertical spacing between adjacent two of the heat exchange tube layers is greater than 0.68 mm and less than 2.66 mm.

As a preferred embodiment, the heat exchange unit is further provided with a spacer bar for spacing adjacent two of the heat exchange tube layers.

As a preferred embodiment, the heat exchange unit is further provided with a spacer bar for spacing adjacent two of the tube ring stacks and attached thereto.

As a preferred embodiment, a bottom of the heat exchanger housing is further provided with a condensed water outlet located at a lowest position at the bottom of the heat exchanger housing.

As a preferred embodiment, the bottom of the heat exchanger housing has a bearing surface for bearing the heat exchange unit and wholly inclined to the condensed water outlet from a side away from the condensed water outlet.

As a preferred embodiment, a height of the heat exchange unit or at least one of the heat exchange tube layers gradually decreases from a side away from the condensed water outlet to a side close to the condensed water outlet.

As a preferred embodiment, a bottom plate of the heat exchanger housing forms the bearing surface by stamping.

As a preferred embodiment, an inclination angle of the bearing surface with respect to a horizontal plane is within 10 degrees.

As a preferred embodiment, a spacing protrusion is disposed between the shielding plate and a top wall of the heat exchanger housing to partition an area above the shielding plate to form top flow channels communicated with the flue gas outlet, respectively.

A water heater, comprising:
a primary heat exchanger; and
the condensing heat exchanger according to any of the above embodiments and located above the primary heat exchanger.

Advantageous Effects

In the condensing heat exchanger according to the embodiment of the present disclosure, the flue gas inlet channel is surrounded by the heat exchange unit and located at a center thereof, such that flue gas enters the center of the heat exchange unit via the flue gas inlet channel, diffuses around through the heat exchange unit to enter the sidewall flue gas exhaust channel, and then is discharged from the flue gas outlet, thereby reducing the flue gas resistance and then lowering the requirement for the fan.

With reference to the following descriptions and drawings, the particular embodiments of the present disclosure will be disclosed in detail to indicate the ways in which the principle of the present disclosure can be adopted. It should be understood that the scope of the present disclosure is not limited to the embodiments.

The features described and/or illustrated with respect to one embodiment may be used in one or more other embodiments in the same or similar way, may be combined with the features in other embodiments, or may take place of those features.

It should be emphasized that the term 'comprise/include' as used herein refers to the presence of features, integers, steps or components, but does not exclude the presence or addition of one or more other features, integers, steps or components.

BRIEF DESCRIPTION OF THE DRAWINGS

The drawings described herein are used only for the purpose of illustration and are not intended to limit the scope of the present disclosure in any way. In addition, the shapes, the scales, and the like of the components in the drawings are merely schematic so as to facilitate the understanding of the present disclosure, rather than specific limitations thereof. Under the teaching of the present disclosure, those skilled in the art can select various possible shapes and scales based on specific conditions to implement the present disclosure.

DETAILED DESCRIPTION

In order to enable those skilled in the art to better understand the technical solutions of the present disclosure, the technical solutions of the embodiments of the present disclosure will be clearly and completely described below in conjunction with the drawings of the embodiments of the present disclosure. Obviously, those embodiments described are only a part, rather than all, of the embodiments of the present disclosure. Based on the embodiments of the present disclosure, any other embodiment obtained by those of ordinary skill in the art without paying any creative effort should fall within the protection scope of the present disclosure.

It should be noted that when an element is referred to as being 'disposed' on another element, it may be directly on another element or there may be an intermediate element. When an element is regarded as being 'connected' to another element, it may be directly connected to another element or there may be an intermediate element at the same time. The terms 'vertical', 'horizontal', 'left', 'right', and similar expressions used herein are only for the purpose of illustration, rather than indicating a unique implementation.

Unless otherwise defined, all technical and scientific terms used herein have the same meanings as those commonly understood by those skilled in the art of the present disclosure. The terms used herein in the specification of the present disclosure are only for the purpose of describing the specific embodiments, rather than limiting the present disclosure. The term 'and/or' used herein includes any and all combinations of one or more of the related items listed.

Referring to FIGS. 1 to 8, an embodiment of the present disclosure provides a condensing heat exchanger 100, which includes: a heat exchanger housing 110 having a flue gas inlet 101 and a flue gas outlet 102; and a heat exchange unit 104 located within the heat exchanger housing 110, wherein a sidewall flue gas exhaust channel 105 communicated with the flue gas outlet 102 is provided between the heat exchange unit 104 and an inner sidewall of the heat exchanger housing 110. The heat exchange unit 104 surrounds a flue gas inlet channel 103 communicated with the flue gas inlet 101; the sidewall flue gas exhaust channel 105 surrounds the heat exchange unit 104; the heat exchange unit 104 is internally provided with a heat exchange flue which communicates the flue gas inlet channel 103 with the sidewall flue gas exhaust channel 105.

In this embodiment, the heat exchanger housing 110 is a cuboid structure as a whole, with an accommodation space for accommodating the heat exchange unit 104 formed therein. The peripheral sidewalls of the heat exchanger housing 110 are two pairs of opposite sidewalls, and correspondingly, the heat exchange unit 104 therein is substantially a cuboid structure as a whole which is matched with the shape of the heat exchanger housing 110. The heat exchanger housing 110 has opposite first and second sidewalls and opposite third and fourth sidewalls, wherein the first, third, second, and fourth sidewalls are annularly arranged in sequence.

Figure 5:
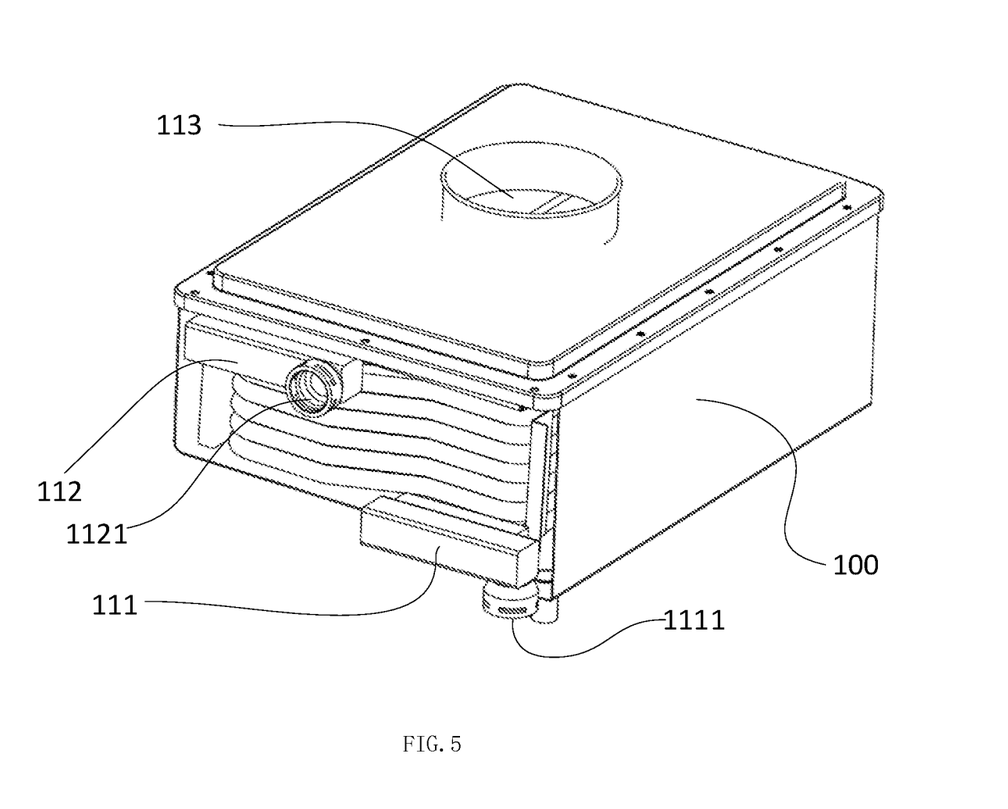
FIG. 5 is a schematic view of a condensing heat exchanger of FIG. 2.
Figure 6:
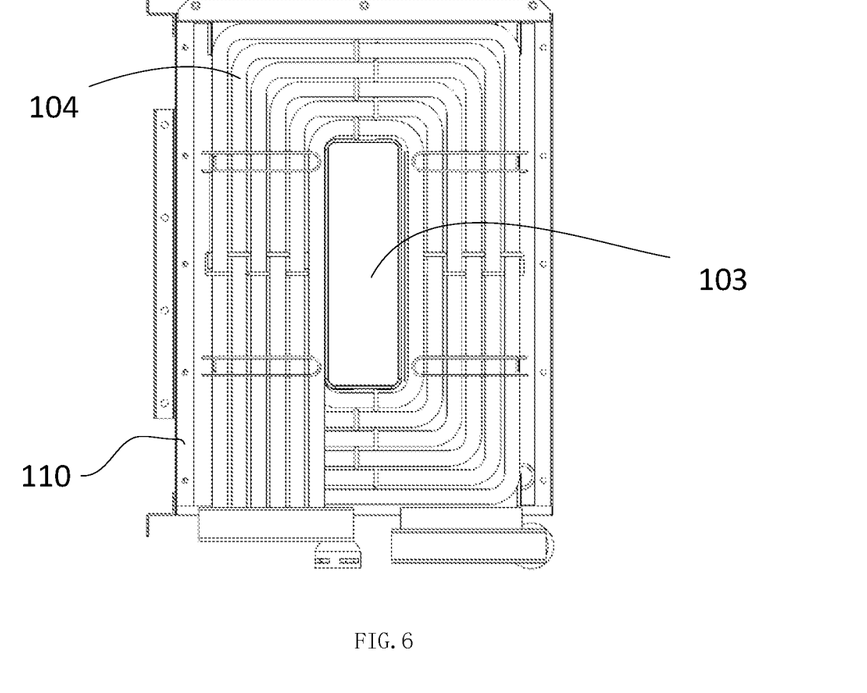
FIG. 6 is an internal top view of FIG. 5.

As illustrated in FIGS. 5 and 6, with the first and second sidewalls being taken as left and right sidewalls, and the third and fourth sidewalls being taken as front and rear sidewalls, left and right sidewall flue gas exhaust channels 105 are formed between the first and second sidewalls and the peripheral sidewalls of the heat exchange unit 104, respectively, and front and rear sidewall flue gas exhaust channels 105 are formed between the third and fourth sidewalls and the peripheral sidewalls of the heat exchange unit 104, respectively. The left sidewall flue gas exhaust channel 105, the rear sidewall flue gas exhaust channel 105, the right sidewall flue gas exhaust channels 105, and the front sidewall flue gas exhaust channel 105 are sequentially communicated to form an annular sidewall flue gas exhaust channel 105 to surround the heat exchange unit 104.

In the condensing heat exchanger 100 according to this embodiment, the flue gas inlet channel 103 is surrounded by the heat exchange unit 104 and located at a center thereof, such that flue gas enters the center of the heat exchange unit 104 via the flue gas inlet channel 103, diffuses around through the heat exchange unit 104 to enter the sidewall flue gas exhaust channel 105, and then is discharged from the flue gas outlet 102, thereby reducing the flue gas resistance and then lowering a requirement for a fan.

When passing through the heat exchange unit 104 via the heat exchange flues inside the heat exchange unit 104, the flue gas fully exchanges heat with the heat exchange unit 104. After the condensing heat exchanger 100 according to this embodiment exchanges heat with the flue gas at the heat exchange efficiency of above 0.92, the temperature of the discharged flue gas is about 21° C. With the same primary heat exchanger 200, the condensing heat exchanger 100 according to this embodiment achieves a heat exchange efficiency equal to or greater than that of the traditional condensing heat exchanger 100 with a lateral flue gas intake (in the experiment, the outlet flue gas temperature is reduced by about 4° C. compared with the traditional example), the flue gas resistance is lower, and a fan speed is reduced by 500 revolutions under a maximum load, so that a low-pressure fan can meet the heat exchange requirement of the water heater.

The condensing heat exchanger 100 may serve as a secondary heat exchanger cooperated with the primary heat exchanger 200 (e.g., a finned tube heat exchanger) to exchange heat with the flue gas so as to heat water. The condensing heat exchanger 100 may be mounted above the primary heat exchanger 200 to continuously exchange heat with the flue gas flowing therefrom. The flue gas enters the condensing heat exchanger 100 from a middle portion thereof, and flows around to exchange heat with the heat exchange tubes of the heat exchange unit 104, thereby reducing the flue gas flow resistance and lowering the requirement for the fan.

Figure 1:
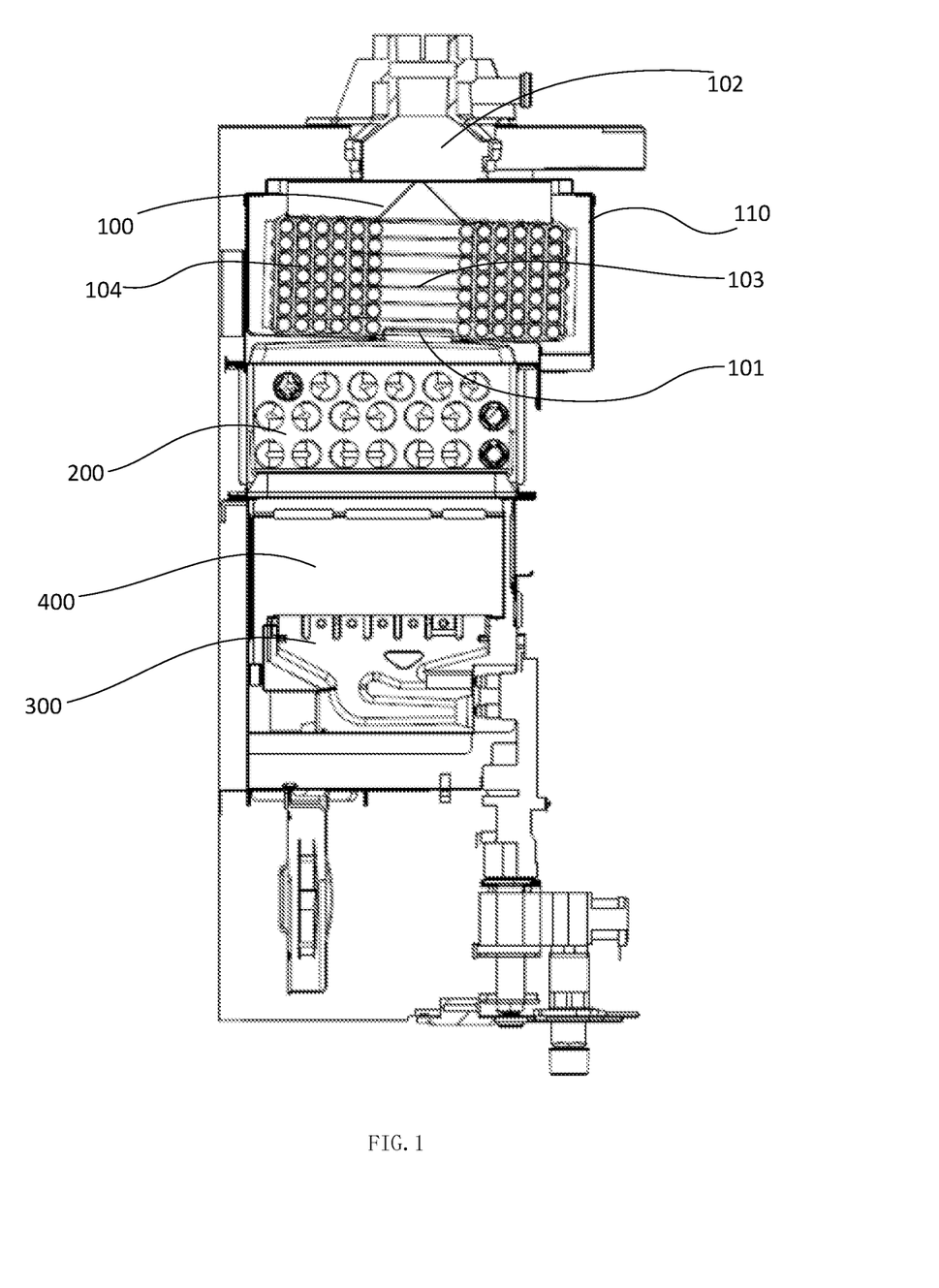
FIG. 1 is a partial view of a water heater according to an embodiment of the present disclosure.
Figure 2:
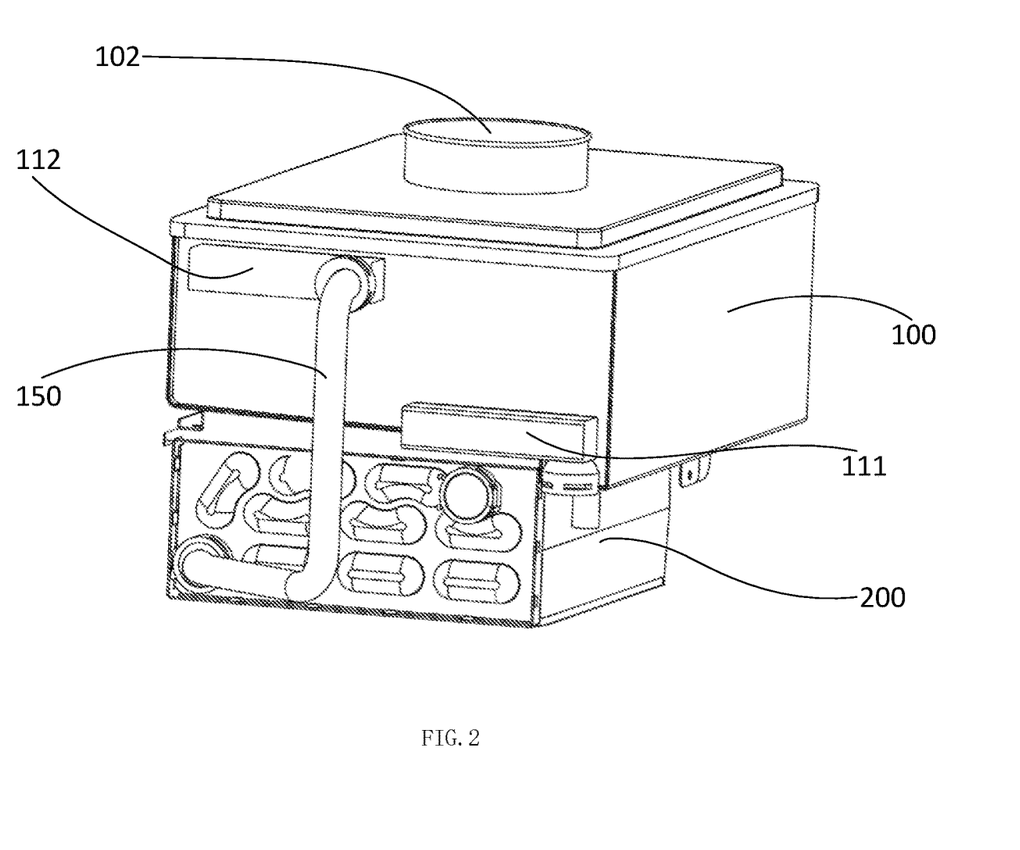
FIG. 2 is a view of an assembly of a condensing heat exchanger and a primary heat exchanger of FIG. 1.

In this embodiment, the heat exchange unit 104 includes a plurality of turns of heat exchange tubes (also called as heat exchange coils) surrounding the flue gas inlet channel 103. The heat exchange tube may be a corrugated tube. As illustrated in FIGS. 1 and 2, the heat exchanger housing 110 is provided with a water inlet part 111 and a water outlet part 112. The water inlet part 111 is configured to input water (e.g., cold water) into the heat exchange unit 104, and the water outlet part 112 is configured to output water after the heat exchange between the heat exchange unit 104 and the flue gas. In which, the water inlet part 111 may be communicated with a cold-water input end of the water heater to input cold water. The water outlet part 112 may be communicated with the primary heat exchanger 200, so that the water flowing out of the condensing heat exchanger 100 can be continuously heated by the primary heat exchanger 200. The primary heat exchanger 200 may be a finned tube heat exchanger. A combustor 300 is disposed below the primary heat exchanger 200, with a combustion chamber 400 therebetween.

The heat exchange unit 104 includes heat exchange tubes communicated between the water inlet part 111 and the water outlet part 112. The heat exchange tubes surround the flue gas inlet channel 103 below a shielding plate 160, and heat exchange flues are formed between the tubes. In order to improve the heat exchange efficiency, the water inlet part 111 is disposed close to a bottom of the heat exchanger housing 110, and the water outlet part 112 is disposed close to a top of the heat exchanger housing 110. An overall flow direction of the water in the heat exchange unit 104 is from bottom to top, and an overall flow direction of the flue gas is from the lower flue gas inlet 101 to the upper flue gas outlet 102. The overall flow direction of the water is substantially the same as that of the flue gas, so that the low-temperature flue gas transferred from the primary heat exchanger 200 can fully exchange heat with the water.

As illustrated in FIGS. 2 and 5, the water inlet part 111 and the water outlet part 112 may be water collecting boxes on the sidewall of the heat exchanger housing 110, and the water collecting boxes are provided with connecting ports 1121 and 1111. The water collecting box used as the water outlet part 112 and the water collecting box used as the water inlet part 111 are located on the same sidewall of the housing 110 and arranged at different vertical positions. A water outlet tube 150 in communication with the primary heat exchanger 200 is communicated with the water outlet part 112, and a water inlet tube for inputting cold water is communicated with the water inlet part 111.

The heat exchange unit 104 is located between the flue gas inlet channel 103 and the sidewall flue gas exhaust channel 105. The flue gas outlet 102 is located above the heat exchange unit 104. Specifically, the flue gas outlet 102 is located above the shielding plate 160. In which, a top flue gas circulation space is provided between the shielding plate 160 and a top wall of the heat exchanger housing 110, and the flue gas from the sidewall flue gas exhaust channel 105 flows upward into the top flue gas circulation space, then flows horizontally to converge at the middle, and is discharged to the outside from the flue gas outlet 102 at the center.

In order to avoid unsmooth discharge of flue gas caused by the collision between the flue gases from both sides, a spacing protrusion 115 is disposed between the shielding plate 160 and the top wall of the heat exchanger housing 110 to partition the area above the shielding plate 160 so as to form top flow channels communicated with the flue gas outlet 102 respectively.

Figure 3:
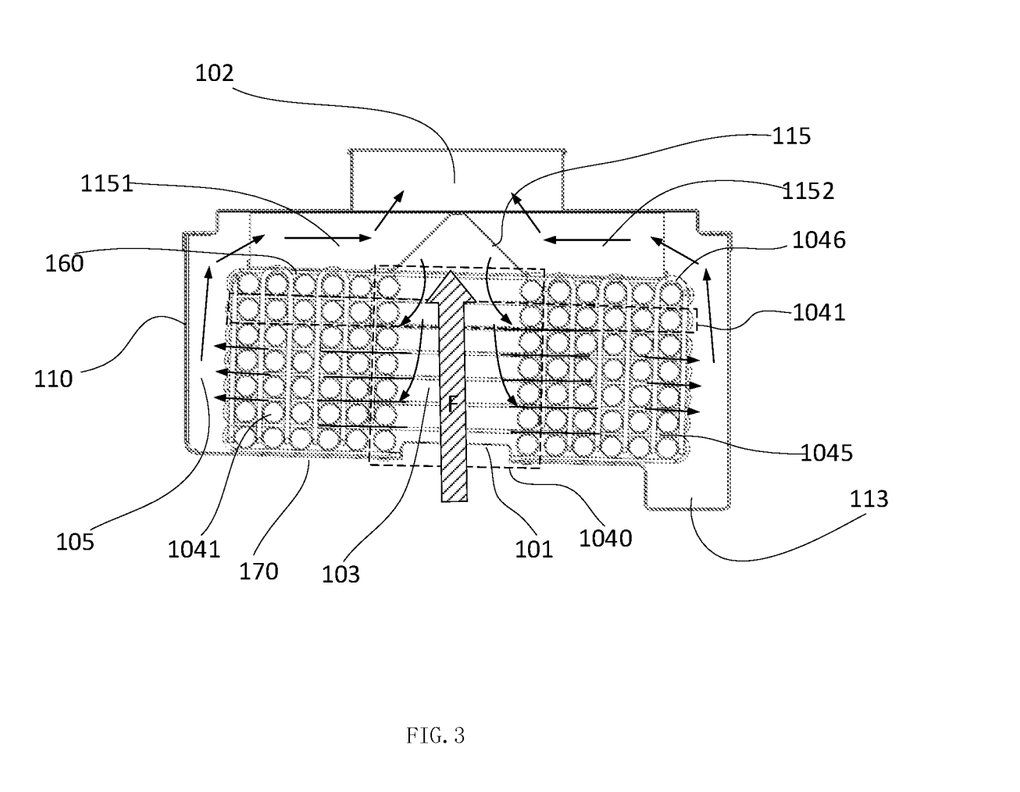
FIG. 3 is a cross-sectional view of a condensing heat exchanger of FIG. 2.
Figure 4:
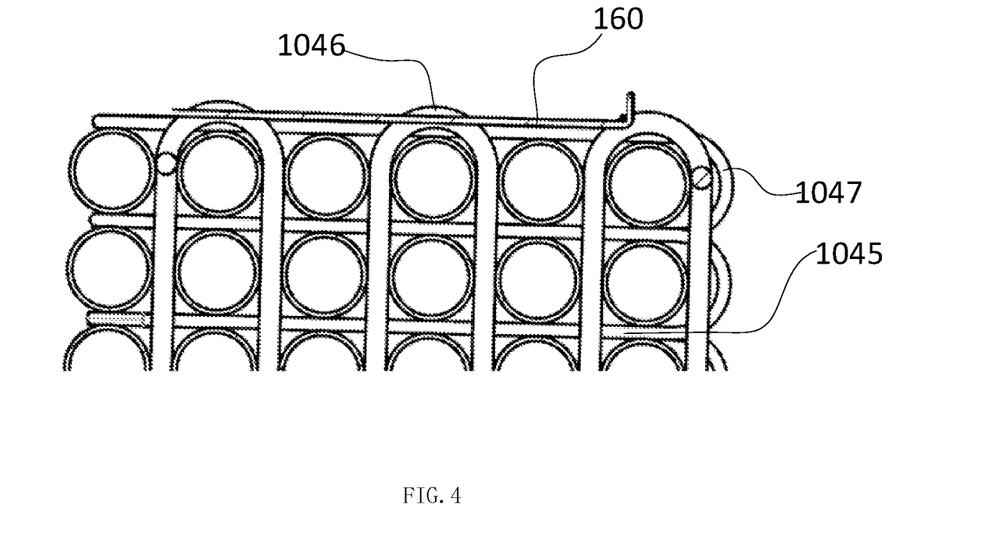
FIG. 4 is a partial enlarged view of FIG. 3.

As viewed from FIG. 3, the spacing protrusion 115 is located on the shielding plate 160, and extends in a front-rear horizontal direction (a direction perpendicular to the paper) to partition the top flue gas circulation space so as to form left and right top flow channels 1151 and 1152. The spacing protrusion 115 is further provided with diversion slopes to divert the flue gas to the flue gas outlet 102. The whole flue gas on the left side (i.e., the flue gas exhausted from about one half of the sidewall flue gas exhaust channel 105) enters the left top flow channel 1151, and may be diverted by the spacing protrusion 115 to the flue gas outlet 102 when flowing to the spacing protrusion 115, and then discharged from the flue gas outlet 102. Similar to the left top flow channel, the whole flue gas on the right side (i.e., the flue gas exhausted from the other half of the sidewall flue gas exhaust channel 105) enters the right top flow channel 1152 and is diverted by the spacing protrusion 115 to the flue gas outlet 102 for discharge.

In this embodiment, the flue gas inlet 101 is located on a bottom plate 170 of the heat exchanger housing 110, and the flue gas outlet 102 is located on a top plate of the heat exchanger housing 110. On the whole, the flue gas inlet 101 and the flue gas outlet 102 are substantially aligned in a vertical direction, the flue gas inlet 101 is substantially located at a central position of the bottom plate 170 of the heat exchanger housing 110, and the flue gas outlet 102 is substantially located a central position of the top plate of the heat exchanger housing 110.

An end of the heat exchange unit 104 close to the flue gas outlet 102 is shielded and blocked by the shielding plate 160. The flue gas inlet channel 103 extends from the flue gas inlet 101 to the shielding plate 160. The shielding plate 160 shields an upper end of the heat exchange unit 104 to prevent the flue gas from flowing directly upwards through the heat exchange unit 104 into the flue gas outlet 102.

In this embodiment, in order to improve the heat exchange efficiency, the heat exchange unit 104 includes a plurality of heat exchange tube layers 1041 stacked in a vertical direction. As illustrated in FIG. 6, the heat exchange tube layers 1041 include a plurality of heat exchange tube rings nested with one another and having surrounded areas gradually decreasing from outside to inside in a radial direction. The heat exchange flues include spacing flues 1045 located between adjacent two of the heat exchange tube layers 1041 in an up-down direction. The spacing flue 1045 is substantially a horizontal flue, and may also be slightly inclined. Among the plurality of heat exchange tube rings, two heat exchange tube rings may be formed by bending the same heat exchange tube or different heat exchange tubes.

In the same heat exchange tube layer 1041, a plurality of heat exchange tube rings are located at the same height and nested one within another, so that the interlayer spacing gap 1045 between adjacent two of the heat exchange tube layers 1041 in the up-down direction forms a heat exchange flue communicating the sidewall flue gas channel with the flue gas inlet channel 103. The heat exchange tube layer 1041 may be wholly placed horizontally, or may be slightly inclined.

The heat exchange tube rings of different heat exchange tube layers 1041 are aligned one by one in the vertical direction (i.e., the flue gas flow direction of the flue gas inlet channel 103 or the extension direction of the flue gas inlet channel 103). That is, the heat exchange tube rings with the same internal area are aligned in the up-down direction. The heat exchange tube rings with the same surrounded area of the different heat exchange tube layers 1041 are stacked in the vertical direction to form a tube ring stack 1040, i.e., the heat exchange tube rings with the same internal area are stacked in the vertical direction to form the tube ring stack 1040. The heat exchange flue further includes a vertical flue located between adjacent two of the tube ring stacks 1040 to communicate a plurality of spacing flues 1045.

Of course, in other embodiments, the heat exchange tube rings of two heat exchange tube layers 1041 in the up-down direction can also be staggered, and the heat exchange efficiency can be improved by setting an appropriate spacing between the heat exchange tube layers.

In this embodiment, the (interlayer) vertical spacing between adjacent two of the heat exchange tube layers 1041 is smaller than the (inter-nest) horizontal spacing between adjacent two of the tube ring stacks 1040. Thus, the flue gas flow resistance is reduced by setting a larger spacing between the tube ring stacks 1040, thereby lowering the requirement for the fan. Further, in order to improve the heat exchange efficiency, the spacing between adjacent two of the heat exchange tube layers 1041 is greater than 0.68 mm and less than 2.66 mm. The heat exchange efficiency of the condensing heat exchanger 100 is ensured by setting an appropriate spacing between the heat exchange tube layers 1041.

In order to ensure a gap consistency of the heat exchange unit 104 in the horizontal direction and the vertical direction and then ensure a condensation consistency of the condensing heat exchanger 100, the heat exchange unit 104 is further provided with spacer bars (1046, 1047) for spacing the heat exchange tube rings. The spacer bars may include a first spacer bar 1047 and a second spacer bar 1046. Specifically, the heat exchange unit 104 is further provided with the first spacer bar 1047 for spacing adjacent two of the heat exchange tube layers 1041. The first spacer bar 1047 is disposed between every two of the heat exchange tube layers 1041. The first spacer bar 1047 between adjacent two of the heat exchange tube layers 1041 substantially extends horizontally or radially for a (interlayer) spacing gap (substantially a horizontal gap/spacing flue 1045) to form the heat exchange flue. In order to ensure the consistency of the interlayer spacing gaps in the peripheral direction, a plurality of first spacing bars 1047 are distributed at intervals in the peripheral direction in each of the interlayer spacing gaps. Specifically, the first spacer bar 1047 may be a U-shaped structure inserted into adjacent two of the interlayer spacing gaps (substantially the horizontal gap/spacing flue 1045).

In order to improve the condensing efficiency, the heat exchange unit 104 is further provided with a second spacer bar 1046 for spacing adjacent two of the tube ring stacks 1040 and attached thereto. The second spacer bar 1046 extends in the vertical direction. The second spacer bar 1046 is attached to the tube walls of the tube ring stacks 1040, which is beneficial for the condensed water on the heat exchange tube to fall down along the second spacer bar 1046, so as to prevent the condensed water from being always accumulated on the heat exchange tube, thereby improving the condensing efficiency. An inter-nest spacing gap is formed between adjacent two of the tube ring stacks 1040. As mentioned above, a gap width of the inter-nest spacing gap is greater than that of the interlayer spacing gap, so as to achieve a smaller flue gas flow resistance and lower the requirement for the fan. The second spacer bar 1046 is a U-shaped structure inserted into the inter-nest spacing gap. A plurality of second spacer bars 1046 are provided in the peripheral direction to ensure the width consistency of the inter-nest spacing gaps.

In other words, the heat exchange unit 104 includes a plurality of tube ring stacks 1040 nested layer by layer in the radial direction. The tube ring stack 1040 includes a plurality of heat exchange tube rings having the same surrounded area and being sequentially stacked in the vertical direction. A vertical flue that communicates the spacing flues 1045 in the up-down direction is provided between adjacent two of the tube ring stacks 1040. The heat exchange tube rings of each of the tube ring stacks 1040 are radially aligned with the heat exchange tube rings of other tube ring stacks 1040 one by one. The heat exchange tube rings located at the same height and sequentially nested from outside to inside (or from inside to outside, or in the radial direction) form the heat exchange tube layer 1041. Further, a plurality of heat exchange tube layers 1041 may form a plurality of tube ring stacks 1040.

Figure 7:
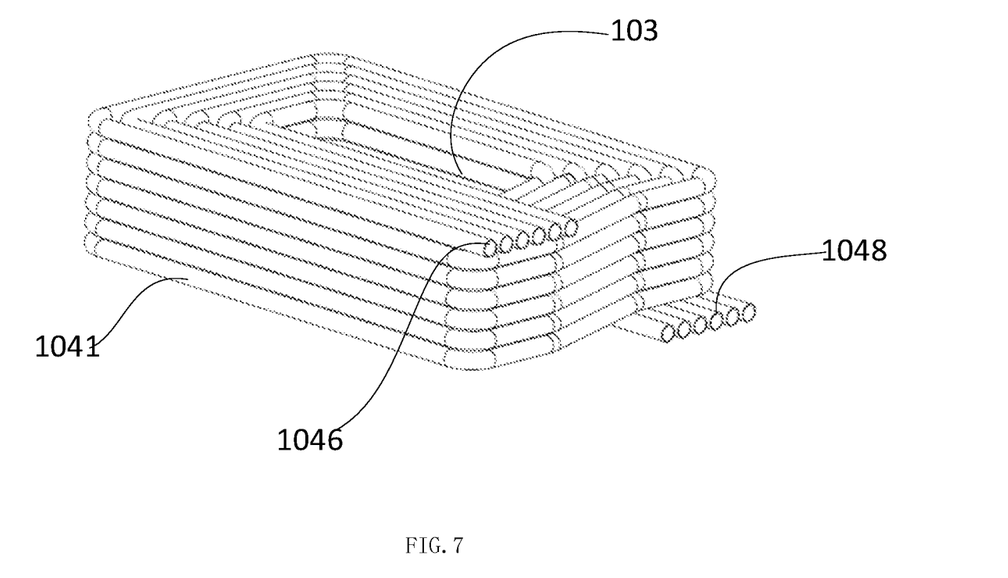
FIG. 7 is a schematic view of a heat exchange unit of FIG. 5.
Figure 8:
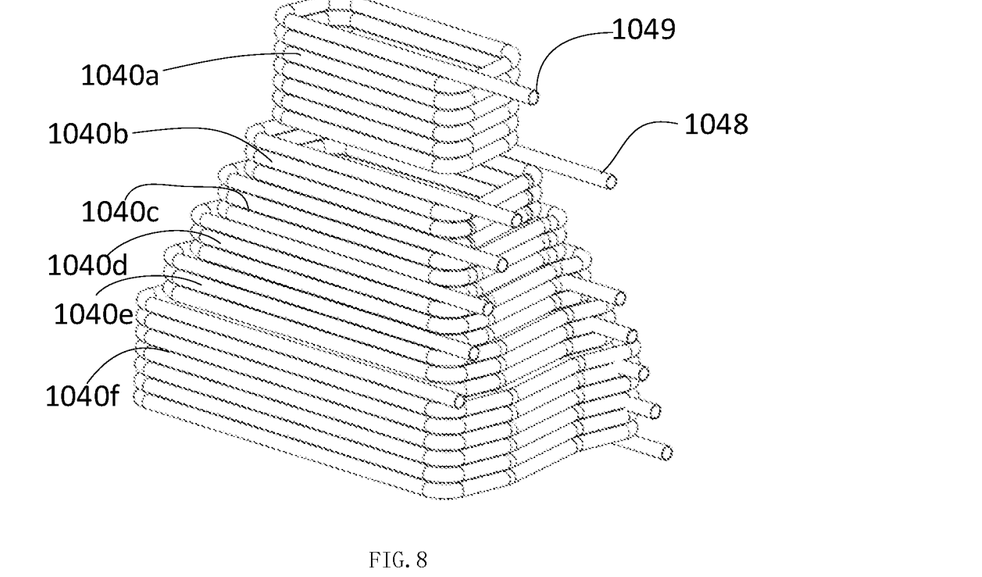
FIG. 8 is an exploded view of FIG. 7.

As illustrated in FIGS. 7 and 8, the tube ring stack 1040 is formed by one heat exchange tube spirally extending from the water inlet part 111 to the water outlet part 112. The heat exchange tube layer 1041 is formed by the heat exchange tube rings located at the same height of the different tube ring stacks 1040. Further, at least two of the tube ring stacks 1040 are connected in parallel between the water inlet part 111 and the water outlet part 112. In this embodiment, the heat exchange unit 104 includes six tube ring stacks 1040a, 1040b, 1040c, 1040d, 1040e and 1040f connected in parallel, each of which has a lower input end 1048 communicated with the water inlet part 111, and an upper water outlet end 1049 communicated with the water outlet part 112.

Of course, in other embodiments, at least two of the tube ring stacks 1040 are connected in series between the water inlet part 111 and the water outlet part 112. For example, two tube ring stacks 1040 are formed by bending the same heat exchange tube. In some other embodiments, some of the tube ring stacks 1040 may be connected in parallel, and some of the tube ring stacks 1040 may be connected in series.

In a specific embodiment, the heat exchange unit 104 includes a first number of tube ring stacks 1040 connected in parallel and a second number of tube ring stacks 1040 connected in parallel. The first number of tube ring stacks 1040 and the second number of tube ring stacks 1040 are connected in series between the water inlet part 111 and the water outlet part 112.

In case of six tube ring stacks 1040 each formed by a continuous spiral extension of one heat exchange tube, a communication part (similar to the water collecting box of the water outlet part 112 or the water inlet part 111 in FIG. 5) is formed on the sidewall of the heat exchanger housing 110, wherein three tube ring stacks 1040 (referred to as the first number of first tube ring stacks 1040) are connected in parallel between the communication part and the water outlet part 112, three tube ring stacks 1040 (referred to as the second number of tube ring stacks 1040) are connected in parallel between the communication part and the water inlet part 111, and the first number of tube ring stacks 1040 and the second number of tube ring stacks 1040 are communicated through the communication part for serial connection.

In an embodiment where all of the tube ring stacks 1040 are connected in parallel between the water inlet part 111 and the water outlet part 112, different heat exchange tube rings located in the same heat exchange tube layer 1041 are independent of each other, rather than communicated with each other, and are formed by the heat exchange tube rings located at the same height of the different tube ring stacks 1040.

Figure 9:
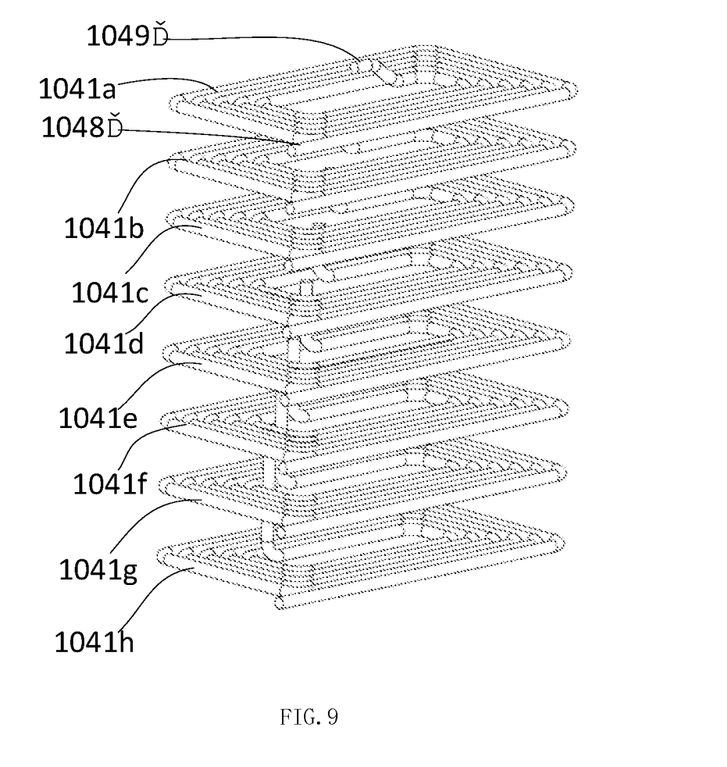
FIG. 9 is a schematic view of a heat exchange unit according to another embodiment of the present disclosure.

In another embodiment, as illustrated in FIG. 9, the heat exchange tube layers 1041a, 1041b, 1041c, 1041d, 1041e, 1041f, 1041g and 1041h are formed by one heat exchange tube spirally winding from outside to inside, and are stacked to form a plurality of tube ring stacks 1040. At least two of the heat exchange tube layers 1041 are connected in parallel between the water inlet part 111 and the water outlet part 112, and/or at least two of the heat exchange tubes are connected in series between the water inlet part 111 and the water outlet part 112.

As illustrated in FIG. 9, in an embodiment where all of the heat exchange tube layers 1041 are connected in parallel between the water inlet part 111 and the water outlet part 112, different heat exchange tube rings of each of the tube ring stacks 1040 are independent of each other, rather than communicated with each other. Each of the heat exchange tube layers 1041 spirally extends inward from a water inlet end 1048', a water outlet end 1049' is inside the heat exchange tube layer 1041 and converges upward to be uniformly communicated with the water outlet part 112, and the water inlet end of each of the heat exchange tube layers 1041 extends leftward to reach the water inlet part 111 on the sidewall of the heat exchanger housing 110.

In this embodiment, the bottom of the heat exchanger housing 110 is further provided with a condensed water outlet 113. In order to collect and discharge the condensed water, the condensed water outlet 113 is located at a lowest position at the bottom of the heat exchanger housing 110. The condensed water outlet 113 is located on the bottom plate 170 of the heat exchange housing 110 and at one side (the right side in the drawing) of the heat exchange unit 104. The condensed water outlet 113 collects the converged condensed water and discharges the condensed water out of the condensing heat exchanger 100.

As illustrated in FIG. 3, in order to improve the condensing efficiency and facilitate the collection of the condensed water, the bottom of the heat exchanger housing 110 has a bearing surface (an inner surface/upper surface of the bottom plate 170) for bearing the heat exchange unit 104 and wholly inclined to the condensed water outlet 113 from a side away from the condensed water outlet 113. The height of each of the heat exchange tube layers 1041 (heat exchange units 104) gradually decreases from the side away from the condensed water outlet 113 to a side close to the condensed water outlet 113. Accordingly, the heat exchange unit 104 is wholly inclined to a side where the condensed water outlet 113 is located.

In FIG. 3, the condensed water outlet 113 is located on the right side of the heat exchange unit 104, the bottom plate 170 and the heat exchange unit 104 are inclined from left to right with the height gradually decreased, and the heat exchange tube layer 1041 (heat exchange unit 104) is inclined so that the condensed water on the heat exchange tube flows to the (vertical or horizontal) spacer bar, then is diverted by the spacer bar to the inclined bottom surface of the heat exchanger housing 110, and is diverted by the inclined bottom surface to the condensed water outlet 113, which promotes to discharge all the condensed water inside the heat exchanger, thereby improving the condensing efficiency and the heat exchange efficiency.

In this embodiment, the bottom plate 170 of the heat exchanger housing 110 forms the bearing surface by stamping. The bottom plate 170 of the heat exchanger housing 110 is an integrally stamped structure. The bottom plate 170 of the heat exchanger housing 110 is formed by stamping as a plate for receiving the condensed water, so that a sheet metal welding position on the bottom plate 170 can be lowered and the water leakage caused by poor welding can be prevented. The flue gas outlet 102 is formed on the bottom plate 170 and has an inward flange structure, which extends into the flue gas inlet channel 103.

Further, the inclination angles of the bearing surface and the heat exchange unit 104 (heat exchange tube layer 1041) with respect to the horizontal plane are within 10 degrees. Preferably, the inclination angles of the bearing surface and the heat exchange unit 104 (heat exchange tube layer 1041) with respect to the horizontal plane is within 5 degrees.

As illustrated in FIG. 1, an embodiment of the present disclosure further provides a water heater, which is a gas water heater, specifically including: a primary heat exchanger 200; and the condensing heat exchanger 100 according to any of the above embodiments. The condensing heat exchanger 100 is above the primary heat exchanger 200 which may be a finned tube heat exchanger. The heat exchange tubes of the primary heat exchanger 200 are communicated with the heat exchange unit 104 of the condensing heat exchanger 100, and specifically, the primary heat exchanger 200 is communicated downstream of the condensing heat exchanger 100.

It should be noted that the combustion part, the primary heat exchanger 200 part and other parts (such as a pipeline connection part, a control part, etc.) of the water heater according to this embodiment may adopt any suitable existing configuration. In order to clearly and concisely explain the technical solution according to this embodiment, the description of the above parts will not be repeated here, and the drawings have been simplified accordingly. However, it should be understood that the scope of this embodiment is not limited thereto.

Any numerical value cited herein includes all lower and upper values that increase by one unit from a lower limiting value to an upper limiting value, as long as there is an interval of at least two units between any lower value and any higher value. For example, if it is stated that the number of certain component(s) or a value of a process variable (e.g., temperature, pressure, time, etc.) is 1 to 90, preferably 20 to 80, and more preferably 30 to 70, the purpose is to illustrate that the specification also explicitly lists values such as 15 to 85, 22 to 68, 43 to 51 and 30 to 32. For a value less than 1, it is appropriate to consider a unit as 0.0001, 0.001, 0.01 or 0.1. These are only examples that are intended to be clearly expressed, and it can be considered that any possible combination of the numerical values listed between a lowest value and a highest value is explicitly set forth in the specification in a similar manner.

Unless otherwise specified, any range includes endpoints and all numerical values between the endpoints. 'About' or 'approximately' used along with a range is suitable for both endpoints of the range. Thus, 'about 20 to 30' is intended to cover 'about 20 to about 30', including at least the indicated endpoints.

All articles and references disclosed, including patent applications and publications, are incorporated herein by reference for all purposes. The phrase 'substantially composed of . . . ' describing a combination should include the determined elements, compositions, components or steps, and any other element, composition, component, or step which substantively does not affect the basic novel features of the combination. When the term 'comprise' or 'include' is used to describe the combination of elements, compositions, components or steps herein, embodiments substantially consisting of the elements, compositions, components or steps are also contemplated. Herein the term 'may' is used to indicate that any described attribute covered by 'may' is optional.

Multiple elements, compositions, components, or steps can be provided by a single integrated element, composition, component or step. Alternatively, a single integrated element, composition, component or step may be divided into multiple separate elements, compositions, components or steps. The disclosure 'a/an' or 'one' used to describe the elements, compositions, components or steps is not intended to exclude other elements, compositions, components or steps.

It should be understood that the above description is for illustration and not for limitation. By reading the above description, many embodiments and many applications other than the provided examples will be obvious to those skilled in the art. Therefore, the scope of the present teaching should be determined not with reference to the above description, but with reference to the appended claims along with the full range of equivalents to which these claims are entitled. For comprehensive purposes, all articles and references, including the disclosures of the patent applications and announcements, are hereby incorporated by reference. Omitting any aspect of the subject matter disclosed herein in the fore-mentioned claims is not intended to give up the content of the subject matter, nor should it be considered that the inventor has not considered the subject matter as a part of the disclosed subject matter of the invention.

What is claimed is:

1. A condensing heat exchanger, comprising:
a heat exchanger housing having a flue gas inlet and a flue gas outlet; and
a heat exchange unit located within the heat exchanger housing,
wherein a sidewall flue gas exhaust channel communicated with the flue gas outlet is provided between the heat exchange unit and an inner sidewall of the heat exchanger housing, the heat exchange unit surrounds a flue gas inlet channel communicated with the flue gas inlet, the sidewall flue gas exhaust channel surrounds the heat exchange unit, and the heat exchange unit is internally provided with a heat exchange flue which communicates the flue gas inlet channel with the sidewall flue gas exhaust channel, and
wherein the heat exchange unit comprises a plurality of heat exchange tube layers stacked in a vertical direction, the heat exchange tube layers comprise a plurality of heat exchange tube rings nested with one another and having surrounded areas gradually decreasing from outside to inside in a radial direction, and the heat exchange flue comprises a spacing flue located between adjacent two of the heat exchange tube layers in an up-down direction.

2. The condensing heat exchanger according to claim 1, wherein the heat exchange tube rings having the same surrounded area of the different heat exchange tube layers are stacked in the vertical direction to form a tube ring stack.

3. The condensing heat exchanger according to claim 2, wherein the heat exchanger housing is provided with a water inlet part and a water outlet part, the tube ring stack is formed by one heat exchange tube spirally extending from the water inlet to the water outlet, and the heat exchange tube layer is formed by the heat exchange tube rings located at the same height of the different tube ring stacks.

4. The condensing heat exchanger according to claim 3, wherein at least two of the tube ring stacks are connected in parallel between the water inlet part and the water outlet part.

5. The condensing heat exchanger according to claim 3, wherein the heat exchanger housing is provided with a water inlet part and a water outlet part, and at least two of the tube ring stacks are connected in series between the water inlet and the water outlet.

6. The condensing heat exchanger according to claim 3, wherein the heat exchange unit comprises a first number of tube ring stacks connected in parallel and a second number of tube ring stacks connected in parallel, and the first number of tube ring stacks and the second number of tube ring stacks are connected in series between the water inlet part and the water outlet part.

7. The condensing heat exchanger according to claim 2, wherein a vertical spacing between adjacent two of the heat exchange tube layers is less than a horizontal spacing between adjacent two of the tube ring stacks.

8. The condensing heat exchanger according to claim 2, wherein the heat exchange unit is further provided with a spacer bar for spacing adjacent two of the tube ring stacks and attached thereto.

9. The condensing heat exchanger according to claim 1, wherein the heat exchange tube layer is formed by one heat exchange tube spirally winding from outside to inside.

10. The condensing heat exchanger according to claim 9, wherein the heat exchanger housing is provided with a water inlet part and a water outlet part, at least two of the heat exchange tube layers are connected in parallel between the water inlet part and the water outlet part, and/or at least two of the heat exchange tubes are connected in series between the water inlet part and the water outlet part.

11. The condensing heat exchanger according to claim 1, wherein a vertical spacing between adjacent two of the heat exchange tube layers is greater than 0.68 mm and less than 2.66 mm.

12. The condensing heat exchanger according to claim 1, wherein the heat exchange unit is further provided with a spacer bar for spacing adjacent two of the heat exchange tube layers.

13. The condensing heat exchanger according to claim 1, wherein a bottom of the heat exchanger housing is further provided with a condensed water outlet located at a lowest position at the bottom of the heat exchanger housing.

14. The condensing heat exchanger according to claim 13, wherein the bottom of the heat exchanger housing has a bearing surface for bearing the heat exchange unit and wholly inclined to the condensed water outlet from a side away from the condensed water outlet.

15. The condensing heat exchanger according to claim 14, wherein a bottom plate of the heat exchanger housing forms the bearing surface by stamping.

16. The condensing heat exchanger according to claim 14, wherein an inclination angle of the bearing surface with respect to a horizontal plane is within 10 degrees.

17. The condensing heat exchanger according to claim 13, wherein a height of the heat exchange unit or at least one of the heat exchange tube layers gradually decreases from a side away from the condensed water outlet to a side close to the condensed water outlet.

18. A condensing heat exchanger, comprising:

a heat exchanger housing having a flue gas inlet and a flue gas outlet; and a heat exchange unit located within the heat exchanger housing, wherein a sidewall flue gas exhaust channel communicated with the flue gas outlet is provided between the heat exchange unit and an inner sidewall of the heat exchanger housing, the heat exchange unit surrounds a flue gas inlet channel communicated with the flue gas inlet, the sidewall flue gas exhaust channel surrounds the heat exchange unit, and the heat exchange unit is internally provided with a heat exchange flue which communicates the flue gas inlet channel with the sidewall flue gas exhaust channel, and wherein the heat exchanger housing is provided with a water inlet part and a water outlet part, and the heat exchange unit comprises a heat exchange tube communicated between the water inlet part and the water outlet part.

19. The condensing heat exchanger according to claim 18, wherein an end of the heat exchange unit close to the flue gas outlet is shielded and blocked by a shielding plate, and the flue gas inlet channel extends from the flue gas inlet to the shielding plate.

20. The condensing heat exchanger according to claim 19, wherein a spacing protrusion is disposed between the shielding plate and a top wall of the heat exchanger housing to partition an area above the shielding plate to form top flow channels communicated with the flue gas outlet, respectively.

21. The condensing heat exchanger according to claim 18, wherein the water inlet part is disposed close to a bottom of the heat exchanger housing, and the water outlet part is disposed close to a top of the heat exchanger housing.

* * * * *

UNITED STATES PATENT AND TRADEMARK OFFICE
CERTIFICATE OF CORRECTION

PATENT NO. : 12,398,923 B2
APPLICATION NO. : 18/255888
DATED : August 26, 2025
INVENTOR(S) : Wei Wang et al.

Page 1 of 1

It is certified that error appears in the above-identified patent and that said Letters Patent is hereby corrected as shown below:

On the Title Page

Under item (73), replace the assignee "A.O. SMITH (CHINA) WATER HEATER CO., LTD., Nanjing (CN)" with "A. O. SMITH CORPORATION, Milwaukee, WI (US)."

Signed and Sealed this
Seventh Day of October, 2025

John A. Squires
*Director of the United States Patent and Trademark Office*